(12) United States Patent
Sim et al.

(10) Patent No.: US 11,587,333 B2
(45) Date of Patent: Feb. 21, 2023

(54) SYSTEMS AND METHODS FOR MONITORING AND MAINTAINING STABILITY OF VEHICLE CARGO

(71) Applicant: GM GLOBAL TECHNOLOGY OPERATIONS LLC, Detroit, MI (US)

(72) Inventors: Jay H. Sim, Bloomfield, MI (US); Daniel S. Glaser, West Bloomfield, MI (US); Justin K. Francisco, White Lake, MI (US); Udo W. Schultheis, Macomb, MI (US); Joseph F. Szczerba, Grand Blanc, MI (US); Yi G. Glaser, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 421 days.

(21) Appl. No.: 16/785,842

(22) Filed: Feb. 10, 2020

(65) Prior Publication Data
US 2021/0248396 A1    Aug. 12, 2021

(51) Int. Cl.
| | |
|---|---|
| *G06K 9/00* | (2022.01) |
| *G06Q 10/08* | (2012.01) |
| *B60R 11/04* | (2006.01) |
| *G07C 5/00* | (2006.01) |
| *B60G 17/019* | (2006.01) |
| *G06N 3/08* | (2006.01) |
| *G06V 20/59* | (2022.01) |
| *G06Q 10/0833* | (2023.01) |

(52) U.S. Cl.
CPC ............ *G06V 20/59* (2022.01); *B60G 17/019* (2013.01); *B60R 11/04* (2013.01); *G06N 3/08* (2013.01); *G06Q 10/0833* (2013.01); *G07C 5/008* (2013.01); *B60R 2300/8006* (2013.01)

(58) Field of Classification Search
None
See application file for complete search history.

(56) References Cited

U.S. PATENT DOCUMENTS

| | | | | |
|---|---|---|---|---|
| 2008/0236275 | A1* | 10/2008 | Breed | G07C 5/0808 73/290 V |
| 2014/0067313 | A1* | 3/2014 | Breed | G01P 15/02 702/141 |
| 2016/0239802 | A1* | 8/2016 | Burch, V | G06Q 10/0833 |
| 2017/0351268 | A1* | 12/2017 | Anderson | G08G 1/0112 |

* cited by examiner

*Primary Examiner* — Anne Marie Antonucci
*Assistant Examiner* — Kyle S Park

(57) ABSTRACT

A system includes a plurality of sensors arranged in a vehicle to monitor an item in a storage area of a vehicle. The system comprises a data processing module configured to process data from the sensors, determine whether the item in the storage area of the vehicle is likely to move within the storage area or is likely to fall from the vehicle during travel, and generate a first indication that the item is likely to move within the storage area or is likely to fall from the vehicle during travel. The data processing module is configured to determine whether the item has moved within the storage area or has fallen from the vehicle during travel and generate a second indication that the item has moved within the storage area or has fallen from the vehicle during travel.

18 Claims, 3 Drawing Sheets

SYSTEMS AND METHODS FOR MONITORING AND MAINTAINING STABILITY OF VEHICLE CARGO

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for monitoring and maintaining stability of vehicle cargo.

Shifting cargo in vehicles (e.g., in cargo beds, trunks, roof mounted racks, trailers, and so on) can distract drivers. Further, items that fall from these cargo areas of the vehicles can litter roadways and hinder drivability of other vehicles on the roadways.

SUMMARY

A system comprises a plurality of sensors arranged in a vehicle to monitor an item in a storage area of a vehicle. The system comprises a data processing module configured to process data from the sensors, determine whether the item in the storage area of the vehicle is likely to move within the storage area or is likely to fall from the vehicle during travel, and generate a first indication that the item is likely to move within the storage area or is likely to fall from the vehicle during travel. The data processing module is configured to determine whether the item has moved within the storage area or has fallen from the vehicle during travel and generate a second indication that the item has moved within the storage area or has fallen from the vehicle during travel.

In another feature, the first indication includes a suggestion regarding one or more of repositioning the item in the storage area, a route to a location to pull over for repositioning the item in the storage area, an alternate route for the travel, and a change in driving behavior.

In another feature, the data processing module is further configured to instruct a suspension subsystem to adjust suspension of the vehicle in response to determining that the item is likely to move within the storage area or is likely to fall from the vehicle during travel.

In another feature, the second indication includes an identification of the item, a location where the item fell from the vehicle, and a route to the location in response to determining that the item fell from the vehicle during travel.

In another feature, the data processing module is further configured to generate a message to send to another vehicle including a location where the item fell from the vehicle in response to determining that the item fell from the vehicle during travel.

In another feature, the data processing module is further configured to verify, before generating the first indication, whether the item is likely to move within the storage area or is likely to fall from the vehicle during travel using a combination of data received from two or more of the sensors.

In another feature, the data processing module is further configured to verify, before generating the second indication, whether the item has moved within the storage area or has fallen from the vehicle using a combination of data received from two or more of the sensors.

In another feature, the sensors include two or more of a camera, a weight sensor, a suspension sensor, a radar sensor, an ultrasonic sensor, and a tire pressure sensor.

In another feature, the storage area includes at least one of a trunk of the vehicle, a cargo area of the vehicle, a rack mounted on a roof of the vehicle, and a trailer hitched to the vehicle.

In another feature, the data processing module comprises a neural network to generate the first indication. The neural network is trained using machine learning to determine when the item is likely to move within the storage area or is likely to fall from the vehicle during travel based on the data from the sensors and additional data regarding at least one of road design, road conditions, and speed limit of a route selected for travel, and historical driving behavior of a driver of the vehicle.

In still other features, a system comprises a processor and a memory comprising instructions for execution by the processor to process data from a plurality of sensors arranged in a vehicle to monitor an item in a storage area of a vehicle. The instructions further cause the processor to determine whether the item in the storage area of the vehicle is likely to move within the storage area or is likely to fall from the vehicle during travel, and generate a first indication that the item is likely to move within the storage area or is likely to fall from the vehicle during travel. The instructions further cause the processor to determine whether the item has moved within the storage area or has fallen from the vehicle during travel, and generate a second indication that the item has moved within the storage area or has fallen from the vehicle during travel.

In another feature, the instructions further cause the processor to include in the first indication a suggestion regarding one or more of repositioning the item in the storage area, a route to a location to pull over for repositioning the item in the storage area, an alternate route for the travel, and a change in driving behavior.

In another feature, the instructions further cause the processor to adjust suspension of the vehicle in response to determining that the item is likely to move within the storage area or is likely to fall from the vehicle during travel.

In another feature, the instructions further cause the processor to include in the second indication an identification of the item, a location where the item fell from the vehicle, and a route to the location in response to determining that the item fell from the vehicle during travel.

In another feature, the instructions further cause the processor to generate a message to send to another vehicle including a location where the item fell from the vehicle in response to determining that the item fell from the vehicle during travel.

In another feature, the instructions further cause the processor to verify, before generating the first indication, whether the item is likely to move within the storage area or is likely to fall from the vehicle during travel using a combination of data received from two or more of the sensors.

In another feature, the instructions further cause the processor to verify, before generating the second indication, whether the item has moved within the storage area or has fallen from the vehicle using a combination of data received from two or more of the sensors.

In another feature, the sensors include two or more of a camera, a weight sensor, a suspension sensor, a radar sensor, an ultrasonic sensor, and a tire pressure sensor.

In another feature, the storage area includes at least one of a trunk of the vehicle, a cargo area of the vehicle, a rack mounted on a roof of the vehicle, and a trailer hitched to the vehicle.

In another feature, the system further comprising a neural network configured to generate the first indication. The neural network is trained using machine learning to determine when the item is likely to move within the storage area or is likely to fall from the vehicle during travel based on the data from the sensors and additional data regarding at least one of road design, road conditions, and speed limit of a route selected for travel, and historical driving behavior of a driver of the vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
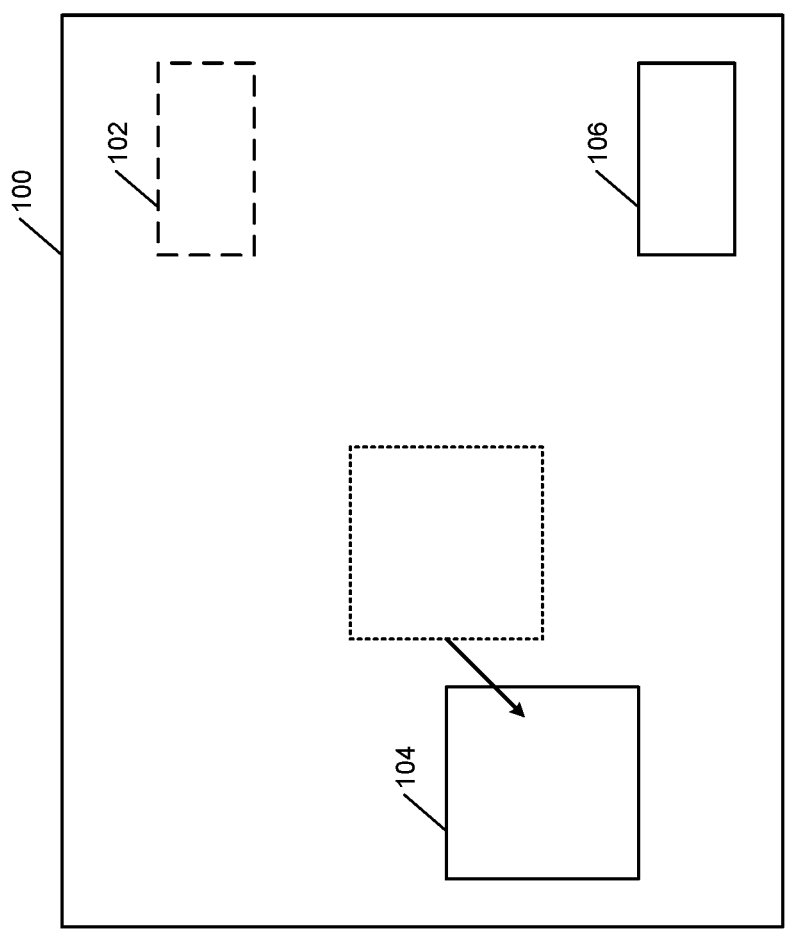
FIG. 1 shows an example of items in a storage area 100 associated with a vehicle.

When hauling items in a truck's cargo bed or in other storage areas of a vehicle or trailer, drivers are often concerned that items may shift or fly-out, causing damage to the cargo as well as posing a potential hazard for other vehicles on the road. To address this issue, cameras can be aimed at the cargo bed to allow drivers to visually examine the cargo bed. However, such systems provide only a view of the cargo bed that requires the driver to continually monitor the display for changes in the cargo's state. The present disclosure aims to reduce the burden on the driver by providing automatic warnings when cargo items shift or fly-out, which eliminates the need to continually monitor the cargo.

The present disclosure provides a system for automatically detecting whether items in a cargo bed or storage area of a vehicle shift or fly-out. The system uses an array of sensors such as but not limited to cameras, ultrasonic sensors, suspension sensors, tire pressure sensors, weight sensors, and radar sensors to monitor activity (i.e., movement) of items. If a shift or fly-out event is detected, the driver is notified/alerted with a relevant human machine interface (HMI), such as an augmented reality camera view, in the vehicle's center-stack display and/or gauge cluster. If a fly-out of a large object is detected and its location may pose a threat to other traffic, other vehicles can be notified using a vehicle-to-vehicle (V2V) network or other (e.g., subscription based) communication systems. Automatic suspension adjustment can also be made if the vehicle becomes unbalanced due to cargo shift. The system relies on artificial intelligence to make these determinations. A machine learning database is used to predict/prevent cargo shift/fly-out event by using current and historical data combined with knowledge of road design, road conditions, speed limits, and personal driving habits. The system can be used with various cargo areas of and associated with vehicles such as but not limited to trunks, rooftops, flat beds, open/closed towed trailers, etc.

For example, the system provides an automatic pop-up video when items in cargo area have shifted, flown-out, or have changed in appearance, position, and/or state. The system automatically saves a video file of time period before cargo items are shifted/flown-out, which can be later reviewed. The system visually highlights loose, at risk, or shifted items with an appropriate HMI notification and an augmented reality live video describing changes in and current status of cargo. The system automatically adjusts the suspension if the vehicle becomes unbalanced due to the cargo shift.

The system provides automatic advice on what to do on detecting loose/shifted items. For example, the advice can include but is not limited to navigation to a stop (pull over) location, navigation pins on a map indicating locations of fly-out items and route to return to fly-out location, alerting relevant authorities of road hazard, automatic video pop-up display with alert, and displaying a cargo state icon (e.g., Good, Recent Weight Shift, Fly-out, Consider Reducing/Repositioning Cargo), and so on.

The system provides automatic advice on what to do to prevent loose/shifted items. For example, the advice can include but is not limited to re-routing to destination via routes with better road design (e.g., less curves, traffic circles, etc.), better road conditions (smoother, no potholes/construction/dirt), providing real-time recommendations for driving behavior and vehicle speed for upcoming road conditions and road designs, and so on. The system notifies additional parties such as police and other vehicles via V2V network or other communication systems when a large flown out object poses a threat to other traffic.

The system reduces the need to manually monitor the cargo by turning body and head or looking at a camera view by taking eyes off the road while driving. Instead, the system automatically provides relevant information including preventive and post cargo event advice to the drivers when a cargo event such as a shift or a fly-out occurs, or to prevent an event from occurring. The system predicts cargo shifts and provides advice on route and driver behavior to prevent cargo shifts/fly-outs. Thus, the system relieves the drivers from the cargo monitoring task and frees up the drivers to maintain eyes on the road while driving.

The system utilizes augmented reality, computer vision, feature tracking, cameras, ultrasonic sensors, weight sensors, radar sensors, cloud database, and artificial intelligence to automatically and continuously monitor and detect whether cargo in vehicle stowage area has shifted, changed state, or flew out of vehicle. The system employs the following methodology, which is described below in detail, to detect if cargo has shifted or flown-out of vehicle: The system predicts and identifies at-risk items for shift/fly-out based on micro-movements detected by cameras and weight sensors combined with knowledge of road design, road conditions, and speed limit on route as well as historical driver behavior. The system provides automated notifications/alerts and feedback including augmented reality live view video images to inform the driver of movement and path of shifting cargo or fly-out. The system provides location and other alerting information to host vehicle driver and other vehicle driver in case of cargo fly-out. The system provides real-time navigational (route) and driving performance advice (acceleration/braking/turning behavior) to prevent cargo shift/fly-out. The system performs automatic suspension adjustment to rebalance the vehicle if necessary. The system utilizes machine learning database to determine if shifting cargo presents an added risk of damage or fly-out; and so on. These and other features of the system of the present disclosure are now described below in further detail.

FIG. 1 shows an example of items in a storage area 100 associated with a vehicle. For example, the storage area 100 may include but is not limited to a trunk of a car, cargo area of a van or a truck, a flat bed of a pickup truck, a rack mounted on a roof of a vehicle, a trailer hitched to a vehicle, and so on. In the example shown, Item 1 102 is shown as having fallen from the vehicle, Item 2 104 is shown as having shifted position in a direction indicated by an arrow, and Item 3 106 is shown as being stable (i.e., not moving around in the storage area 100).

Figure 2:
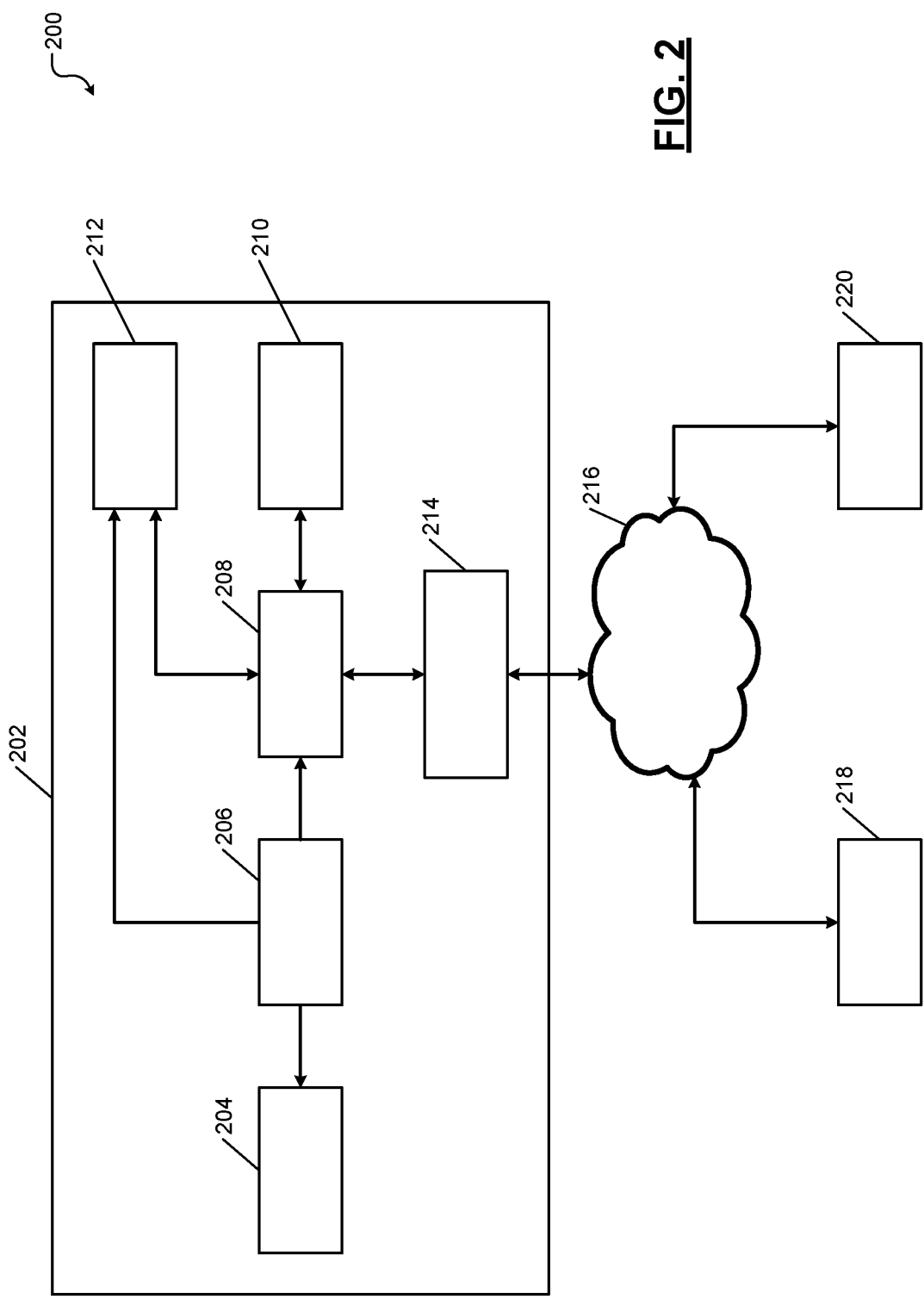
FIG. 2 shows a system for monitoring and maintaining stability of vehicle cargo according to the present disclosure.

FIG. 2 shows a system 200 for monitoring and maintaining stability of vehicle cargo in the vehicle's storage area according to the present disclosure. The system 200 comprises a vehicle 202, a storage area 204 of the vehicle 202, a plurality of sensors 206, a data processing module 208, an infotainment subsystem 210, other vehicle subsystems 212, and a communication module 214.

For example, the storage area 204 of the vehicle 202 may be similar to the storage area 100 shown and described above with reference to FIG. 1. The sensors 206 can include but are not limited to cameras, ultrasonic sensors (used for parking), suspension sensors, tire pressure sensors, weight sensors, radar sensors, and so on. The sensors 206 may be distributed throughout the vehicle 202. Based on the data collected from the sensors 206, the infotainment subsystem 210 can provide audiovisual indications to the driver of the vehicle 202 about the state of the cargo in the storage area 204 of the vehicle 202.

The other vehicle subsystems 212 can include but are not limited to a navigation subsystem, a suspension subsystem, a braking subsystem, a traction subsystem, an autonomous driving subsystem, and so on. For example, the navigation subsystem can include a GPS subsystem, and a traffic and weather subsystem. Each subsystem including elements 210 and 212 include a controller that controls the respective subsystem via respective actuators.

The communication module 214 can communicate with other vehicles 218 and a server 220 (e.g., in a cloud) via a communication system 216 (e.g., a cellular network, a vehicle-to-vehicle or V2V network, a vehicle-to-infrastructure or V2I network, and so on).

Each sensor 206 can detect a different aspect or characteristic of the items in the storage area 204 of the vehicle 202. For example, a weight sensor can sense weight of an item or a change in weight in the storage area 204 due to movement (or fly-out) of an item. A camera and a radar sensor can detect movement of fly-out of an item; and so on. Accordingly, the sensors 206 can collect various types of data that can be used in combination to determine position and movement of items in the storage area 204 of the vehicle 202. The sensors 206 output the data to the data processing module 208. The data processing module 208 analyzes the data from a combination of the sensors 206. Based on the analysis, the data processing module 208 determines the position and movement of the items in the storage area 204 of the vehicle 202.

Some of the sensors 206 also output data to corresponding vehicle subsystems 212. For example, the weight sensors provide data to a suspension subsystem, which can adjust the suspension of the vehicle 202 (e.g., by using a damping system, a load leveling system, or both). A damping system adjusts actuators in dampers based on vehicle speed, acceleration, and steering angle to reduce vibration and improve ride experience. A load leveling system maintains ride height of the vehicle above the road regardless of the load (i.e., weight of the items) in the vehicle. In other examples, the tire pressure sensors provide data to traction control subsystem. Ultrasonic sensors provide data to a parking subsystem. Radar sensors provide data to an obstacle detection subsystem, a lane control subsystem, an autonomous driving subsystem, and so on. These other vehicle subsystems 212 in turn can provide data to and receive data from the data processing module 208 for monitoring and maintaining stability of vehicle cargo.

The data processing module 208 outputs various alerts (e.g., indications) for the driver of the vehicle 202 via the infotainment subsystem 210. The alerts can be messages, signs such as icons, audio and/or visual indications, videos showing item movement of fly-out, and so on. The alerts indicate status of items (e.g., shifting, flying out) in the storage area 204 of the vehicle 202.

For example, when the driver loads the items in the storage area 204 of the vehicle 202, the data processing module 208 can suggest to the driver via the infotainment subsystem 210 that some of the items may need to be rearranged or redistributed or else the items can move about in the storage area 204 or can fly out of the vehicle 202 during travel. If the driver does not follow the suggestions, the data processing module 208 may further advise the driver to take a particular route to the destination, assuming that the driver inputs the destination into a navigation subsystem of the vehicle 202. For example, the suggested route may include fewer curves, turns, traffic circles, speed bumps, construction and so on, which can minimize the risk of the items shifting and/or flying out of the vehicle 202. For example, the data processing module 208 can obtain such information from the navigation subsystem onboard the vehicle 202.

In addition, the data processing module 208 can suggest to the driver via the infotainment subsystem 210 that the driver should drive at a particular speed, not accelerate/decelerate rapidly, not brake abruptly, make smooth turns, and so on (collectively called driving behavior), so as to minimize the risk of the items shifting and/or flying out of the vehicle 202. Additionally, the data processing module 208 can instruct the suspension subsystem to automatically adjust the suspension of the vehicle 202 (e.g., by using a damping system and/or a load leveling system) such that the vehicle 202 is rebalanced, which can minimize the risk of the items shifting and/or flying out of the vehicle 202.

If an item shifts during the travel, the data processing module 208 detects that based on the data received from the sensors 206. For example, the data processing module 208 can predict and identify at-risk items for shift/fly-out based on micro-movements of items detected by cameras and weight sensors. The data processing module 208 can further base the prediction based on data stored on and obtained from the server 220 regarding road design, road conditions, and speed limit on the route being traveled as well as the driver's historical driving behavior. The data processing module 208 may generate an alert for the driver that is output via the infotainment subsystem 210, which can include a video showing the item shifting. The data processing module 208 can additionally locate (using the onboard navigation system) and output via the infotainment subsystem 210 a location of an upcoming parking spot where the vehicle can be pulled over to reposition the items in the storage area 204. In addition, the data processing module 208 can again advise the driver regarding an alternate route, altering driving behavior, and so on as described above. The data processing module 208 can further readjust the suspension after the driver has repositioned the items in the storage area 204.

If an item falls out of the vehicle 202, the data processing module 208 detects that based on the data received from the sensors 206. The data processing module 208 may generate an alert for the driver of the vehicle 202 that is output via the infotainment subsystem 210, which can include a video showing the item flying out of the vehicle 202. In addition, using the onboard navigation system, the data processing module 208 can identify the location where the item flew out of the vehicle and indicate the location on the map on the infotainment subsystem 210. Further, using the onboard navigation system, the data processing module 208 can also provide a route to the location where the item fell from the vehicle 202 so that the driver can quickly locate and retrieve item. The video showing the item flying out of the vehicle 202 can indicate to the driver the surroundings in which the item flew out, which can further assist the driver in locating and retrieving the item.

In addition, upon detecting a fly-out event, the data processing module 208 can generate a message that the communication module 214 can transmit to police and other vehicles (e.g., within a particular range of the vehicle 202) via the communication system 216 (e.g., a cellular network, a V2V network, a V2I network, etc.). For example, the message can include a possible description of the item (e.g., bulky, weight, hazardous, etc.) and the location where the item fell from the vehicle 202. This can help police and other vehicles on the road to locate the item and avoid or minimize any hazard posed by the item.

Often, input from just one senor may be insufficient to determine whether an item has moved or flown out of the vehicle 202. Rather, inputs from multiple different sensors may be used to make the determination. Further, the determination that an item has moved or flown out of the vehicle 202 can be verified or confirmed by using inputs from other additional sensors such as weight sensors and ultrasonic sensors. Radar sensors located in rear corners and rear center of the vehicle can be particularly helpful in detecting items flying out of the vehicle 202.

False positives can also be identified using data from multiple sensors. For example, consider a vehicle carrying liquid in a tank. The liquid often sways in the tank. While the weight sensors and suspension sensors will detect a shifting item, a camera can observe that the tank is stable although the liquid in the tank is swaying. Thus, based on the combined inputs from all these sensors, the data processing module 208 can resolve the ambiguous or apparent shifting in this example and will not indicate a shifting item.

The server 220 in the cloud stores various types of data including but not limited to drivers' driving behavior, road designs, road conditions, and so on. Additionally, the server 220 stores data from various vehicles regarding cargo shifts and fly-out locations, including data about the items. The data processing module 208 accesses this database in the server 220 via the communication module 214 and the communication system 216. The data processing module 208 uses machine learning techniques and uses this data from the server 220 to train a neural network to identify risk of cargo shift and fly-out and to determine if a shifting cargo presents an added risk of fly-out. After making such a determination, the data processing module 208 suggests to the driver of the vehicle 202 via the infotainment subsystem 210 how and where to reposition the at-risk item in the storage area 204, an alternate route to travel to prevent shifting or flying out, and changes in driving behavior as explained above.

For example, a neural network can be trained using data collected by the server 220 from vehicles about shifts and fly-outs occurring in particular geographic areas. For example, the data can include actual cargo events such as shifts or fly-outs (e.g., confirmed by drivers) or a relatively large lateral or longitudinal force detected by vehicles' sensors. The trained neural network can then be deployed and used with some confidence by the data processing module 208 to predict shifts and fly-outs in these and other geographic areas having similar road conditions, for example. The neural network can be continually trained based on new data of cargo events collected by the server 220 on an ongoing basis to further improve the predicting capability of the neural network. Thus, the server 220 not only provides historical data but also functions as another data processor in the cloud in addition to the data processing module 208 in the vehicle 202.

Figure 3:
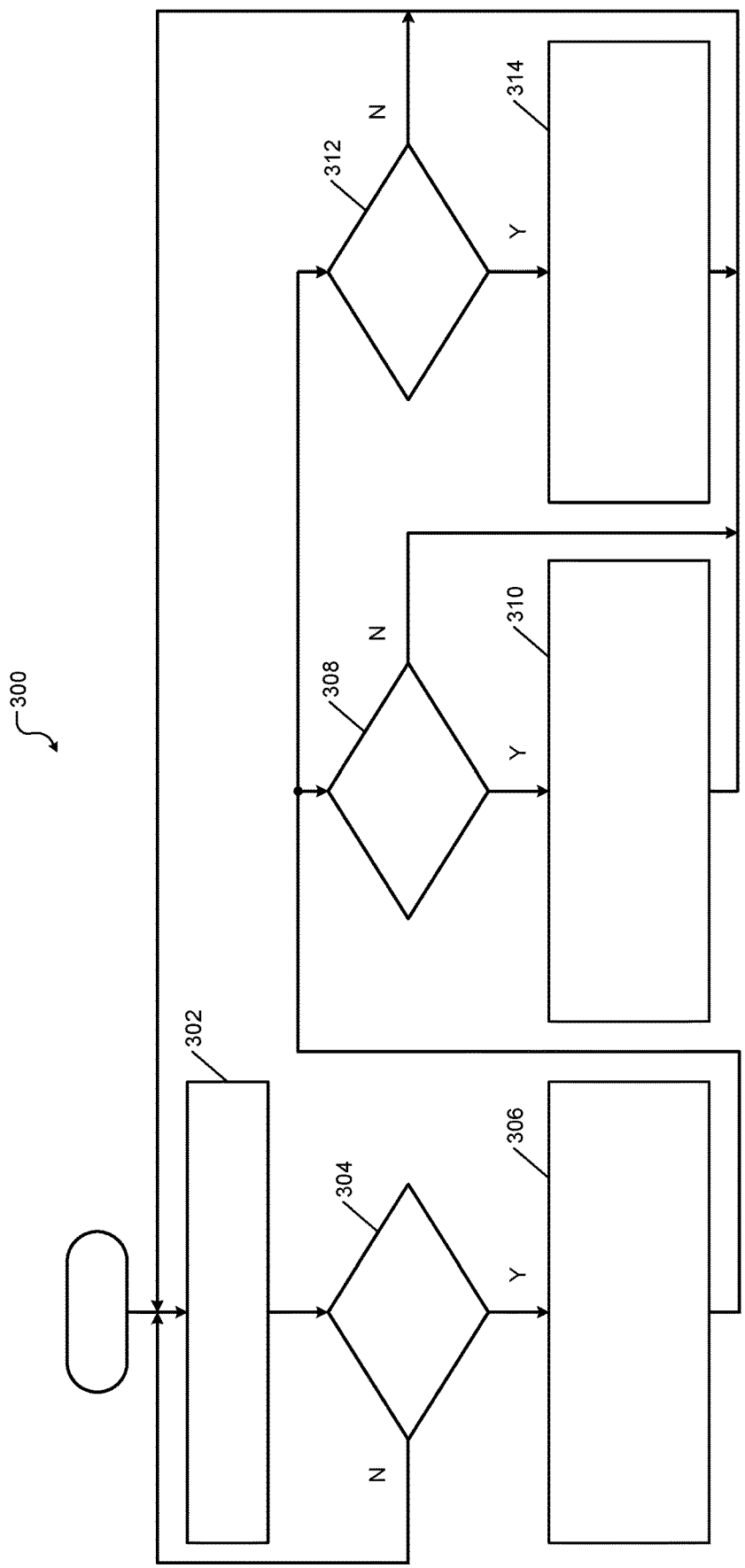
FIG. 3 shows a method for monitoring and maintaining stability of vehicle cargo according to the present disclosure.

FIG. 3 shows a method 300 for monitoring and maintaining stability of vehicle cargo according to the present disclosure. For example, the method 300 may be performed by the system 200. For example, one or more elements of the system 200, such as but not limited to the data processing module 208, may perform one or more steps of the method 300.

At 302, the method 300 monitors items in a storage area of a vehicle (e.g., storage area 204) using various sensors (e.g., sensors 206). At 304, the method 300 determines based on the data received from the sensors whether an item is likely to move or fly out of the vehicle. The method 300 uses a trained neural network to predict whether an item is likely to move or fly out of the vehicle. The method 300 returns to 302 if the items in the storage area are not likely to move or fly out. The method 300 proceeds to 306 if an item is likely to move or fly out of the vehicle.

At 306, the method 300 alerts the driver of the vehicle that an item is likely to move or fly out of the vehicle. The method 300 provides the driver with suggestions regarding repositioning the item that is likely to move or fly out of the vehicle. The method 300 provides the driver an alternate route to travel to prevent or minimize the chances of the item moving or flying out of the vehicle. The method 300 adjusts the suspension of the vehicle to rebalance the load in the vehicle.

At 308, the method 300 determines if an item has moved. The method 300 returns to 302 if an item has not moved. The method 300 proceeds to 310 if an item has moved. At 310, the method 300 verifies or confirms using sensor data (e.g., ultrasonic and weight sensor data) that the item has in fact moved. The method 300 alerts the driver of the vehicle that an item has moved. The method 300 provides the driver with suggestions regarding repositioning the item. The method 300 provides the driver a location of an upcoming or nearest parking spot where the driver can pull over and reposition the item. The method 300 provides the driver an alternate route to travel to prevent or minimize the chances of the item moving or flying out of the vehicle. The method 300 adjusts the suspension of the vehicle to rebalance the load in the vehicle. The method 300 returns to 302.

At 312, the method 300 determines if an item has flown out of the vehicle. The method 300 returns to 302 if an item has not flown out of the vehicle. The method 300 proceeds to 314 if an item has flown out of the vehicle. At 314, the method 300 verifies or confirms using sensor data (e.g., radar and weight sensor data) that the item has in fact flown out of the vehicle. The method 300 alerts the driver of the vehicle that an item has flown out of the vehicle. The method 300 alerts other parties such as police and other vehicles in the vicinity that an item has flown out on the roadway. The method 300 provides the driver with a video recording showing the item flying out of the vehicle along with a location and route to retrieve the item. The method 300 returns to 302.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a plurality of sensors arranged in a vehicle to monitor an item in a storage area of the vehicle; and
a data processing module configured to:
process data from the sensors;
determine whether the item in the storage area of the vehicle is likely to move within the storage area or is likely to fall from the vehicle during travel;
generate a first indication that the item is likely to move within the storage area or is likely to fall from the vehicle during travel;
determine whether the item has moved within the storage area or has fallen from the vehicle during travel; and
generate a second indication that the item has moved within the storage area or has fallen from the vehicle during travel,
wherein the data processing module comprises a neural network trained using machine learning to:
generate the first and second indications based on the data from the sensors and additional data regarding at least one of road design, road conditions, and speed limit of a route selected for travel, and historical driving behavior of a driver of the vehicle; and
provide an augmented notification to the driver via a human machine interface (HMI) in response to generating the first and second indication;
wherein the augmented notification in response to generating the first indication includes an augmented view of the item, a path in which the item is likely to move, and a prediction that the item is likely to fall from the vehicle; and
wherein the augmented notification in response to generating the second indication includes a navigation pin on a map indicating a location where the item has fallen from the vehicle and a route to return to the location.

2. The system of claim 1 wherein the first indication includes a suggestion regarding one or more of repositioning the item in the storage area, a route to a location to pull over for repositioning the item in the storage area, an alternate route for the travel, and a change in driving behavior.

3. The system of claim 1 wherein the data processing module is further configured to instruct a suspension subsystem to adjust suspension of the vehicle in response to determining that the item is likely to move within the storage area or is likely to fall from the vehicle during travel.

4. The system of claim 1 wherein the second indication includes an identification of the item, the location where the item fell from the vehicle, and the route to the location in response to determining that the item fell from the vehicle during travel.

5. The system of claim 1 wherein the data processing module is further configured to generate a message to send to another vehicle including a location where the item fell from the vehicle in response to determining that the item fell from the vehicle during travel.

6. The system of claim 1 wherein the data processing module is further configured to verify, before generating the first indication, whether the item is likely to move within the storage area or is likely to fall from the vehicle during travel using a combination of data received from two or more of the sensors.

7. The system of claim 1 wherein the data processing module is further configured to verify, before generating the second indication, whether the item has moved within the storage area or has fallen from the vehicle using a combination of data received from two or more of the sensors.

8. The system of claim 1 wherein the sensors include two or more of a camera, a weight sensor, a suspension sensor, a radar sensor, an ultrasonic sensor, and a tire pressure sensor.

9. The system of claim 1 wherein the storage area includes at least one of a trunk of the vehicle, a cargo area of the vehicle, a rack mounted on a roof of the vehicle, and a trailer hitched to the vehicle.

10. A system comprising:
a processor; and
a memory comprising instructions for execution by the processor to:
process data from a plurality of sensors arranged in a vehicle to monitor an item in a storage area of the vehicle;
determine whether the item in the storage area of the vehicle is likely to move within the storage area or is likely to fall from the vehicle during travel;
generate, using a neural network, a first indication that the item is likely to move within the storage area or is likely to fall from the vehicle during travel;
determine whether the item has moved within the storage area or has fallen from the vehicle during travel; and
generate, using the neural network, a second indication that the item has moved within the storage area or has fallen from the vehicle during travel,
wherein the neural network is trained using machine learning to:
generate the first and second indications based on the data from the sensors and additional data regarding at least one of road design, road conditions, and speed limit of a route selected for travel, and historical driving behavior of a driver of the vehicle; and
provide an augmented notification to the driver via a human machine interface (HMI) in response to generating the first and second indication;
wherein the augmented notification in response to generating the first indication includes an augmented view of the item, a path in which the item is likely to move, and a prediction that the item is likely to fall from the vehicle; and
wherein the augmented notification in response to generating the second indication includes a navigation pin on a map indicating a location where the item has fallen from the vehicle and a route to return to the location.

11. The system of claim 10 wherein the instructions further cause the processor to include in the first indication a suggestion regarding one or more of repositioning the item in the storage area, a route to a location to pull over for repositioning the item in the storage area, an alternate route for the travel, and a change in driving behavior.

12. The system of claim 10 wherein the instructions further cause the processor to adjust suspension of the vehicle in response to determining that the item is likely to move within the storage area or is likely to fall from the vehicle during travel.

13. The system of claim 10 wherein the instructions further cause the processor to include in the second indication an identification of the item, the location where the item fell from the vehicle, and the route to the location in response to determining that the item fell from the vehicle during travel.

14. The system of claim 10 wherein the instructions further cause the processor to generate a message to send to another vehicle including a location where the item fell from the vehicle in response to determining that the item fell from the vehicle during travel.

15. The system of claim 10 wherein the instructions further cause the processor to verify, before generating the first indication, whether the item is likely to move within the storage area or is likely to fall from the vehicle during travel using a combination of data received from two or more of the sensors.

16. The system of claim 10 wherein the instructions further cause the processor to verify, before generating the second indication, whether the item has moved within the storage area or has fallen from the vehicle using a combination of data received from two or more of the sensors.

17. The system of claim 10 wherein the sensors include two or more of a camera, a weight sensor, a suspension sensor, a radar sensor, an ultrasonic sensor, and a tire pressure sensor.

18. The system of claim 10 wherein the storage area includes at least one of a trunk of the vehicle, a cargo area of the vehicle, a rack mounted on a roof of the vehicle, and a trailer hitched to the vehicle.

* * * * *